(12) United States Patent
Keeley et al.

(10) Patent No.: US 8,116,330 B2
(45) Date of Patent: Feb. 14, 2012

(54) BRIDGE APPARATUS AND METHODS FOR COUPLING MULTIPLE NON-FIBRE CHANNEL DEVICES TO A FIBRE CHANNEL ARBITRATED LOOP

(75) Inventors: James W. Keeley, Hollis, NH (US); Douglas E. Sanders, Framingham, MA (US); Andrew Hyonil Chong, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 232 days.

(21) Appl. No.: 12/475,838

(22) Filed: Jun. 1, 2009

(65) Prior Publication Data

US 2010/0303085 A1  Dec. 2, 2010

(51) Int. Cl.
*H04L 12/56* (2006.01)

(52) U.S. Cl. ...................................... 370/401

(58) Field of Classification Search .................. 370/401, 370/390, 432
See application file for complete search history.

(56) References Cited

U.S. PATENT DOCUMENTS

| | | | |
|---|---|---|---|
| 6,430,645 B1 | 8/2002 | Basham | |
| 7,343,524 B2 | 3/2008 | Klotz et al. | |
| 7,352,706 B2 | 4/2008 | Klotz et al. | |
| 7,382,790 B2 | 6/2008 | Warren | |
| 7,397,788 B2 | 7/2008 | Mies | |
| 7,441,154 B2 * | 10/2008 | Klotz et al. | 714/39 |
| 7,471,691 B2 | 12/2008 | Black | |
| 2002/0144046 A1 | 10/2002 | Hooper, III | |
| 2002/0162010 A1 | 10/2002 | Allen et al. | |
| 2004/0081187 A1 | 4/2004 | Warren et al. | |
| 2004/0085972 A1 | 5/2004 | Warren et al. | |
| 2004/0085994 A1 | 5/2004 | Warren et al. | |
| 2007/0050568 A1 * | 3/2007 | Elliott et al. | 711/154 |

FOREIGN PATENT DOCUMENTS

EP  0858190 A2  8/1998

* cited by examiner

*Primary Examiner* — Dang Ton
*Assistant Examiner* — Kevin Lee
(74) *Attorney, Agent, or Firm* — Duft Bornsen & Fishman LLP (57) ABSTRACT

Apparatus and methods for an enhanced bridge device for coupling multiple non-Fiber Channel storage devices to a Fiber Channel Arbitrated Loop (FC-AL) communication medium. Features and aspects hereof provide for FC-AL enhanced circuits for processing loop port bypass (LPB) and loop port enable (LPE) primitive sequences addressed to any target arbitrated loop physical address (T-ALPA) associated with a storage device coupled with the bridge regardless of the present bypassed/non-bypassed status of other T-ALPAs processed by the bridge device and associated with other storage devices coupled with the bridge device.

17 Claims, 8 Drawing Sheets

Non-FC-AL Storage Device Initialized by FC-AL Agent – Set Valid Bit Corresponding to Assigned T-ALPA in Valid Bit Vector — 800

BRIDGE APPARATUS AND METHODS FOR COUPLING MULTIPLE NON-FIBRE CHANNEL DEVICES TO A FIBRE CHANNEL ARBITRATED LOOP

BACKGROUND

1. Field of the Invention

The invention relates generally to Fibre Channel environments and more specifically relates to a bridge apparatus and methods for interconnecting a plurality of non-Fibre Channel devices to a Fibre Channel arbitrated loop (FC-AL) through a bridge device.

2. Discussion of Related Art

Storage systems have evolved from utilizing bus parallel bus connections with host systems to high speed serial communication structures and protocols. Serial communication structures and protocols advantageously provide high-speed combined with lower cost cabling and longer distance cabling restrictions while further providing improved noise immunity as compared with costly parallel bus structure cabling. In particular, Fibre Channel media and protocols utilizing fiber optic communication media have been popular for some time. The fiber optic communication media provided high speed and substantial noise immunity as compared to any electrical coupling (parallel or serial). Fibre Channel standards are well known to those of ordinary skill in the art and documented standards for various aspects of the Fibre Channel architecture are readily available at sites such as www.t11.org.

Serial attached SCSI (SAS) and serial advanced technology attachment (SATA) communication protocols have largely supplanted Fibre Channel as the preferred media and protocols for coupling computing systems to storage devices in high performance storage area networks. SAS and SATA provide substantially lower cost alternatives to older Fibre Channel techniques while maintaining similar performance levels. Thus SAS and SATA storage devices are far more common and cost effective at present as compared to Fibre Channel storage devices.

In some storage applications where older, legacy, storage networks utilized Fibre Channel as the preferred coupling for high-performance storage networks, users may have substantial investment in the host bus adapters and other related storage network appliances used to couple host systems to the Fibre Channel storage network. Though SAS and SATA storage devices are relatively inexpensive, it is difficult in such legacy environments to justify the expense of replacing the entire Fibre Channel communication infrastructure (i.e., host bus adapters, fiber optic cabling, Fibre Channel network appliances, etc.) merely for the savings of lower cost storage devices. Some prior developments have therefore provided bridge devices for coupling SAS and SATA storage devices to a Fibre Channel network.

In Fibre Channel connectivity, one popular structure/topology is referred to as a Fibre Channel arbitrated loop (FC-AL). In such a topology, all devices are coupled in a ring or loop configuration such that information is passed from device to device until the device particularly addressed by a transaction receives the transactions and processes them. Typically in such a topology a Fibre Channel (FC) host is assigned a static reserved address (typically an address of zero) on the arbitrated loop. Such an FC host acts as a system agent to enable or bypass individual devices utilizing loop port enable (LPE) and loop port bypass (LPB) FC primitive sequences. A device that has been bypassed in the loop topology and does not participate in the transactions exchanged over the loop topology. Rather, such a bypassed device, though physically resident in the loop topology, is logically passive and ignores most Fibre Channel transactions.

In a typical FC-AL topology, each device on the loop represents a single target arbitrated loop physical address (T-ALPA). The enabling (setting a device to a non-bypassed state) or bypassing of a loop port using LPE or LPB FC primitive sequences enables or bypasses the single device corresponding to the T-ALPA address in the primitive sequence. For cost efficiency and simplicity, present-day bridging devices that allow coupling of SAS or SATA storage devices to an existing FC-AL topology utilize a single T-ALPA in the loop topology regardless of the number of physical SAS or SATA storage devices coupled with the bridge device. Other higher layer addressing mechanisms are utilized for selecting a particular SAS or SATA device through the bridge device but at the lowest layer of LPE/LPB FC primitive sequences, all devices coupled with the bridge device having a single T-ALPA would be enabled or bypassed.

To allow for each individual storage device coupled with a bridge to be individually enabled or bypassed, some prior solutions have provided software/firmware capabilities programmed to execute on a processor within the bridge device to receive the loop port enable and loop port bypass primitive sequences and attempt to enable and bypass individual devices storage devices coupled with the bridge through more complex software analysis. However, the FC primitive sequences (also known as "ordered sets") exchanged at this lowest level are repeated in rapid succession in accordance with the FC specifications (e.g., the FC-AL specifications requires that at least three consecutive LPB/LPE primitive sequences are transmitted before a recipient acts on the received primitive sequence). Such software/firmware solutions are generally incapable of the performance required to adequately process and respond to the bypass primitive sequences received in such rapid succession in accordance with FC-AL specifications. Thus, prior software solutions are incapable of fully complying with the FC-AL specifications. Various test and real application scenarios applied to present bridge devices may fail to comply with the FC-AL specifications where, for example, a bridge device attempts to process the loop port bypass/enable sequences using software/firmware but fails to do so with adequate performance.

By way of example, in one exemplary prior art software/firmware implemented bridge solution, an FC circuit of the bridge detects receipt of an LPB primitive sequence and causes an interrupt of the general purpose processor of the bridge device to analyze and process the received LPB primitive sequence. While the processor is analyzing and processing the received primitive sequence, the FC circuit of the bridge device forces a "fill" word on the FC-AL medium to indicate an idle period while the bridge device processes a received primitive sequence. In one exemplary test, an LPB primitive sequence is sent to an FC-AL device under test immediately followed by a primitive sequence addressing the same device that was just bypassed. For example, an OPEN primitive sequence may be transmitted immediately following the LPB primitive sequence. According to FC-AL standards the device should process both the LPB and the OPEN such that the FC host would receive the OPEN primitive sequence back from the FC-AL topology as not processed by the addressed device (because it was successfully bypassed). If the software/firmware interrupt processing of a present bridge device cannot process the LPB in a timely enough fashion to update its loop port state machine (LPSM) in time to receive and forward the OPEN primitive sequence (as the device would if properly bypassed), the bridge device may not properly process the OPEN primitive sequence and thus may create an apparent error condition. Though such a test scenario may be extreme and rare in practice, it is within the specifications of the FC-AL architecture. Thus, there is no useful capability in present FC to SAS/SATA bridge devices to permit enabling or bypassing of individual SAS/SATA devices coupled with the bridge device.

Thus it is an ongoing challenge to enhance the flexibility of enabling and bypassing each of multiple non-FC storage devices coupled with an FC-AL communication medium through a bridge device.

SUMMARY

The present invention solves the above and other problems, thereby advancing the state of the useful arts, by providing apparatus and methods for a bridge device for coupling multiple storage devices with an FC-AL loop in such as manner as to place individual ones of the multiple storage devices into a bypassed or non-bypassed state regardless of the state of other storage devices coupled with the FC-AL loop through the bridge device.

In one aspect hereof, a Fibre Channel bridge device is provided. The bridge device includes a Fibre Channel interface circuit for coupling with a Fibre Channel arbitrated loop (FC-AL). The interface is adapted to respond to multiple target arbitrated loop physical addresses (T-ALPAs). The bridge device also includes a back-end interface circuit adapted to couple with a plurality of storage devices. The plurality of storage devices are not FC-AL storage devices. The bridge device further includes a bypass control logic circuit coupled with the Fibre Channel interface circuit and coupled with the back-end interface circuit. The bypass control logic circuit is adapted to map one of the multiple T-ALPAs to each of the plurality of storage devices. The bypass control logic circuit is further adapted to process loop port enable (LPE) and loop port bypass (LPB) Fibre Channel primitive sequences for each of the multiple T-ALPAs so as to bypass and enable individual ones of the plurality of storage devices regardless of the state of others of the plurality of storage devices.

Another aspect hereof provides a method operable in a Fibre Channel Arbitrated Loop (FC-AL) interface circuit of an FC-AL bridge device adapted to couple multiple non-FC-AL storage devices to an FC-AL communication medium. The method includes placing a particular storage device coupled with the bridge device into a non-bypassed state in response to receipt by the bridge device of a loop port enable (LPE) primitive sequence received from the FC-AL communication medium identifying the particular storage device. The particular storage device is entered into a non-bypassed state regardless of the bypassed/non-bypassed state of other storage devices coupled with the bridge device. The method also includes placing a particular storage device coupled with the bridge device into a bypassed state in response to receipt by the bridge device of a loop port bypass (LPB) primitive sequence received from the FC-AL communication medium identifying the particular storage device. The particular storage device is entered into a bypassed state regardless of the bypassed/non-bypassed state of other storage devices coupled with the bridge device.

Still another aspect hereof provides a bridge device for coupling a plurality of serial attached SCSI (SAS) storage devices and/or serial advanced technology attachment (SATA) storage devices to a Fibre Channel arbitrated loop (FC-AL) communication medium. The bridge device includes a back-end interface circuit adapted to couple with a plurality of SAS/SATA storage devices. The bridge device also includes a Fibre Channel interface circuit coupled with the back-end interface and adapted for coupling with the FC-AL communication medium. The Fibre Channel interface circuit including logic circuits adapted for implementing FC0, FC1, FC2, SCSI-FCP, and FC-AL layers of the Fibre Channel protocols. The FC-AL layer logic circuits including a bypass control logic circuit adapted to map multiple target arbitrated loop physical addresses (T-ALPAs) to corresponding storage devices of the plurality of storage devices. The bypass control logic circuit is further adapted to process loop port enable (LPE) and loop port bypass (LPB) Fibre Channel primitive sequences for each of the multiple T-ALPAs so as to bypass and enable individual ones of the plurality of storage devices regardless of the state of others of the plurality of storage devices.

DETAILED DESCRIPTION OF THE DRAWINGS

Figure 1:
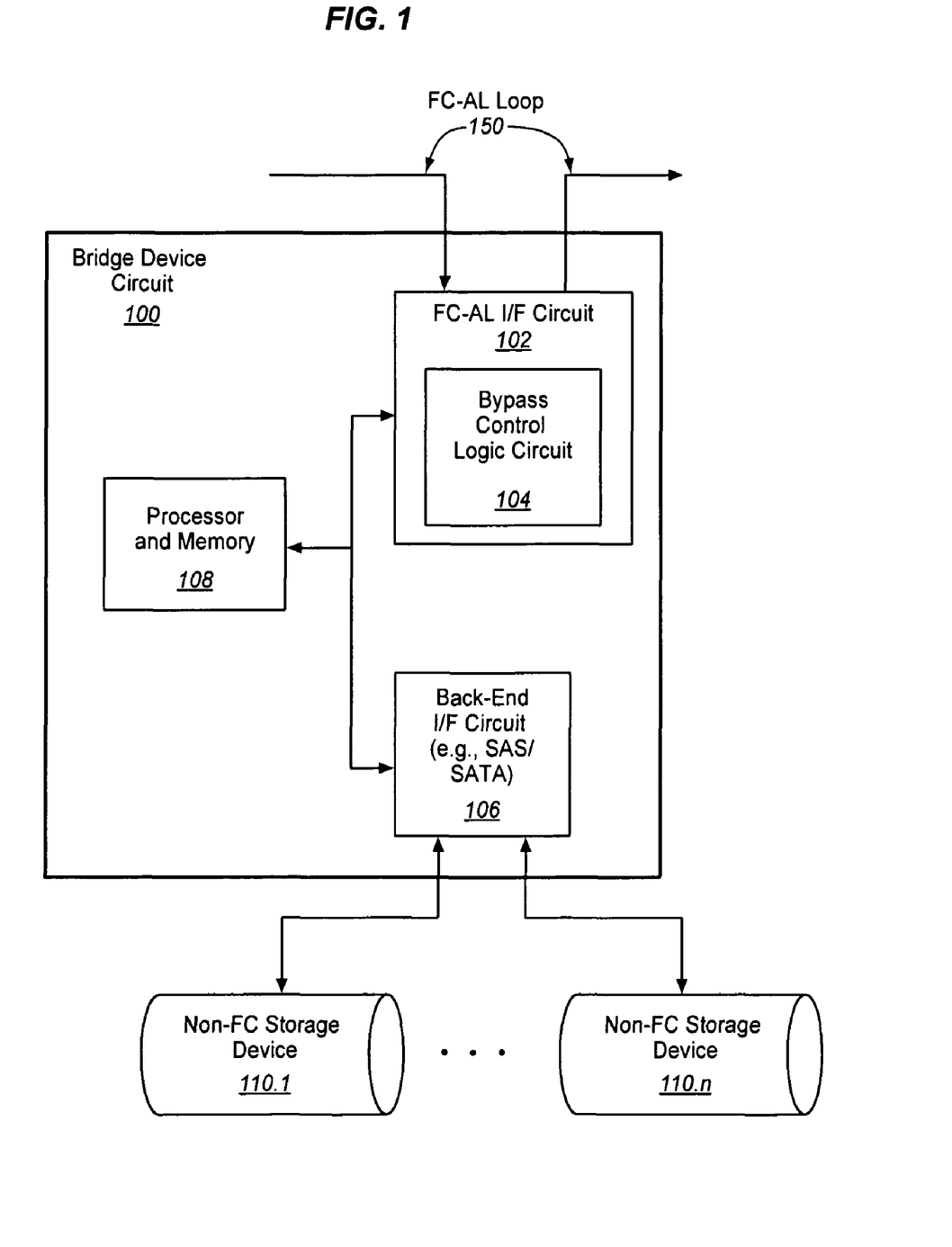
FIG. 1 is a block diagram of a system including an exemplary embodiment of an enhanced bridge device in accordance with features and aspects hereof for coupling a plurality of storage devices to an FC-AL loop.

FIG. 1 is a block diagram of a bridge device circuit 100 enhanced in accordance with features and aspects hereof to include bypass control logic circuit 104. As noted above, prior techniques either did not allow individual devices coupled with the bridge to be independently bypassed or relied solely on software implemented within the bridge device handle the loop port state machine (LPSM) bypass logic when coupling a plurality of storage devices to an FC-AL loop. By contrast, bypass control logic circuit 104 provides custom logic circuits for processing the loop port bypass features and primitive sequences for each of the storage devices 110.1 through 110.n coupled through bridge device circuit 100 with FC-AL loop 150.

Bypass control logic circuit 104 is coupled with FC-AL interface circuit 102 to permit integration of processing of bypass control logic circuit 104 with the LPSM circuitry standard within most commercially available FC-AL interface circuits 102. In one exemplary embodiment, as discussed further herein below, bypass control logic circuit 104 may be integrated within the FC-AL interface circuit 102. In other embodiments, the bypass control logic circuit 104 may be implemented as a separate component from the FC-AL interface circuit 102 but may require tight coupling of interface signals therebetween to permit logical integration of the bypass control logic circuit function within that of the LPSM processing of the enhanced bridge device circuit 100.

Though the bypass control features hereof are implemented as custom logic circuits (104), enhanced bridge device 100 may still include processor and memory 108 for controlling overall configuration and administration of the bridge device circuit 100. Backend interface circuit 106 provides the desired interface to the non-Fibre Channel storage devices 110.1 through 110.n. In one exemplary embodiment the backend interface circuit 106 may provide serial attached SCSI (SAS) and/or serial advanced technology attachment (SATA) interface logic for coupling SAS/SATA storage devices to the enhanced bridge device circuit 100.

As discussed in further detail herein below, bypass control logic 104 (in conjunction with FC-AL interface logic 102) permits individual storage devices to be bypassed on the FC-AL loop 150 regardless of the status of other storage devices coupled with the bridge 100. In other words, enhanced bridge device 100 responds to multiple T-ALPAs addressed by primitive sequences that contain a T-ALPA on the FC-AL loop 150 and allows each T-ALPA to be bypassed individually regardless of the bypassed/non-bypassed status of all other T-ALPAs managed by the bridge device 100.

Figure 2:
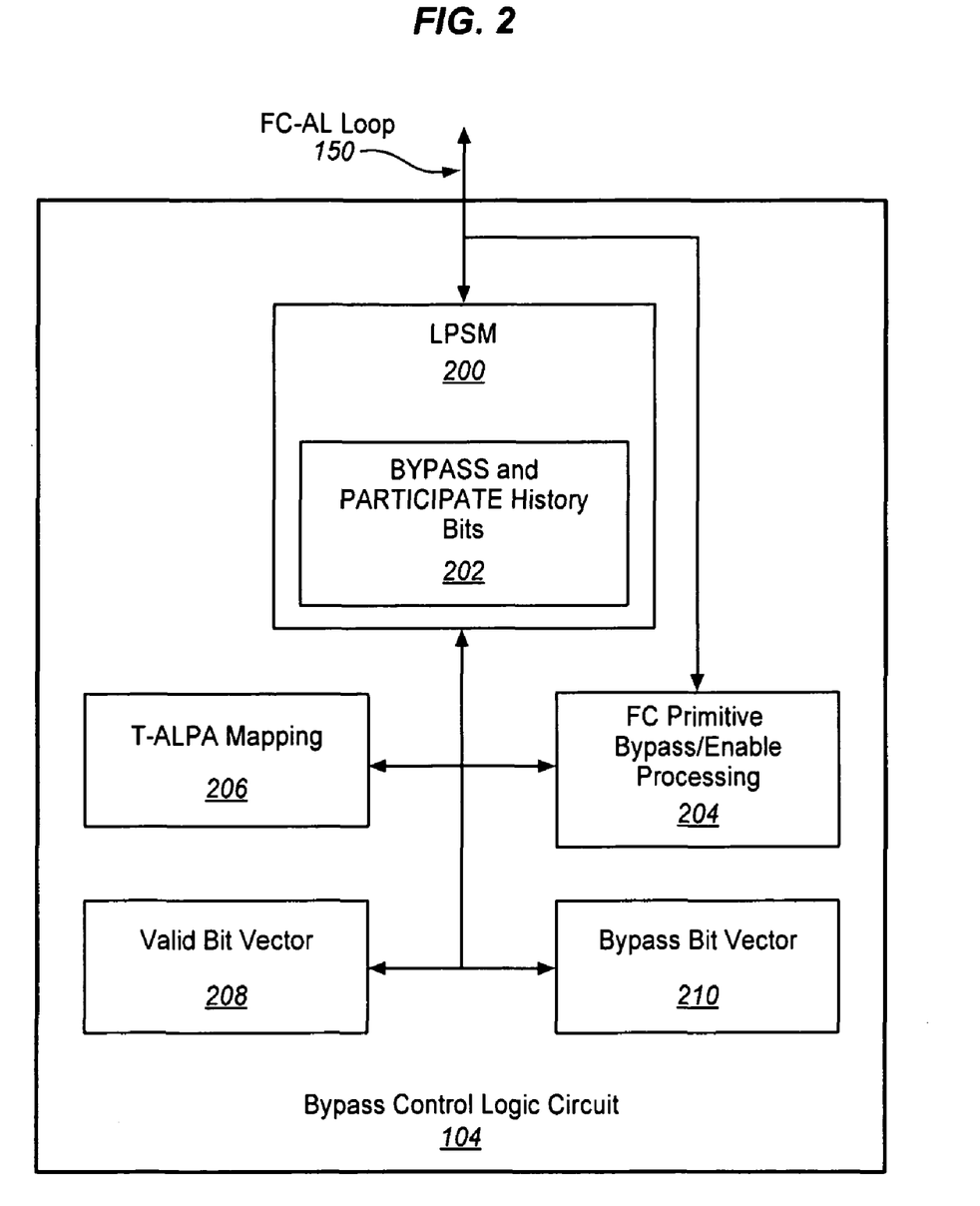
FIG. 2 is a block diagram providing exemplary functional details of a bypass control logic circuit of FIG. 1 in accordance with features and aspects hereof.

FIG. 2 is a block diagram providing exemplary additional details of functions performed by the bypass control logic circuit 104 of FIG. 1. Bypass control logic circuit 104 includes FC primitive sequence bypass/enable processing function 204 to receive loop port bypass (LPB) and loop port enable (LPE) primitive sequences from the FC-AL communication medium (received in parallel with the LPSM 200 receiving and processing FC-AL primitive sequences). In other words, LPSM 200 processes Fibre Channel primitive sequences in accordance with standard Fibre Channel Arbitrated Loop processing techniques but incorporates enhanced processing for loop port bypass and loop port enable by incorporating functions of element 204.

As noted above, LPSM 200 (normally implemented within a Fibre Channel interface circuit) may be tightly coupled with the bypass control logic circuit 104. As discussed further herein below, the FC-AL interface circuit and the bypass control logic circuit may be integrated as a single application specific integrated circuit or custom designed circuit in accordance with well known design choices. Bypass control logic circuit 104 includes history bits 202 (e.g., BYPASS and PARTICIPATED history bits typically integrated within and utilized by the LPSM 200 in accordance with Fibre Channel standard specifications). The BYPASS and PARTICIPATE history bits utilized by LPSM 200 may be set and reset in accordance with the LPSM standard processing features provided by the FC-AL specifications but enhanced by utilization of the valid bit sector 208 and the bypass bit vector 210 of bypass control logic circuit 104. In one exemplary embodiment the valid bit vector 208 and bypass bit vector 210 each comprise an array of bits where each bit corresponds to one of multiple target arbitrated loop physical addresses (T-ALPAs).

Mapping element 206 provides functionality to map a particular T-ALPA to a corresponding bit in the valid bit vector 208 and to a corresponding bit in the bypass bit vector 210 to identify appropriate bits when processing loop port bypass and loop port enable primitive sequences in conjunction with the LPSM 200. In one exemplary embodiment the mapping of a T-ALPA to a corresponding bit in either the valid bit vector 208 or the bypass bit vector 210 provides for simple utilization of the T-ALPA value as an index into each bit vector. Those of ordinary skill in the art will readily recognize numerous other data structures and mapping techniques for mapping each of multiple T-ALPAs to corresponding information indicating whether that T-ALPA is presently valid (i.e., associated with a corresponding storage device) and whether the corresponding T-ALPA is presently in a bypassed state.

Valid bit vector 208 and bypass the bit vector 210 may be implemented utilizing any suitable memory structure within the bypass control logic circuit 104. For example, simple register constructs may be utilized to represent a storage bit corresponding to each of 127 possible T-ALPAs processed by the bypass control logic circuit 104. Other suitable memory structures may include various types of random access memory (RAM) including, for example, DRAM, static RAMs, video RAMs, nonvolatile RAMs, SDRAMs, etc. FC primitive sequence bypass/enable processing element 204 and any required mapping processing provided by T-ALPA mapping element 206 may be implemented as customized application specific integrated circuitry providing the desired logical function as described further herein below.

Figure 3:
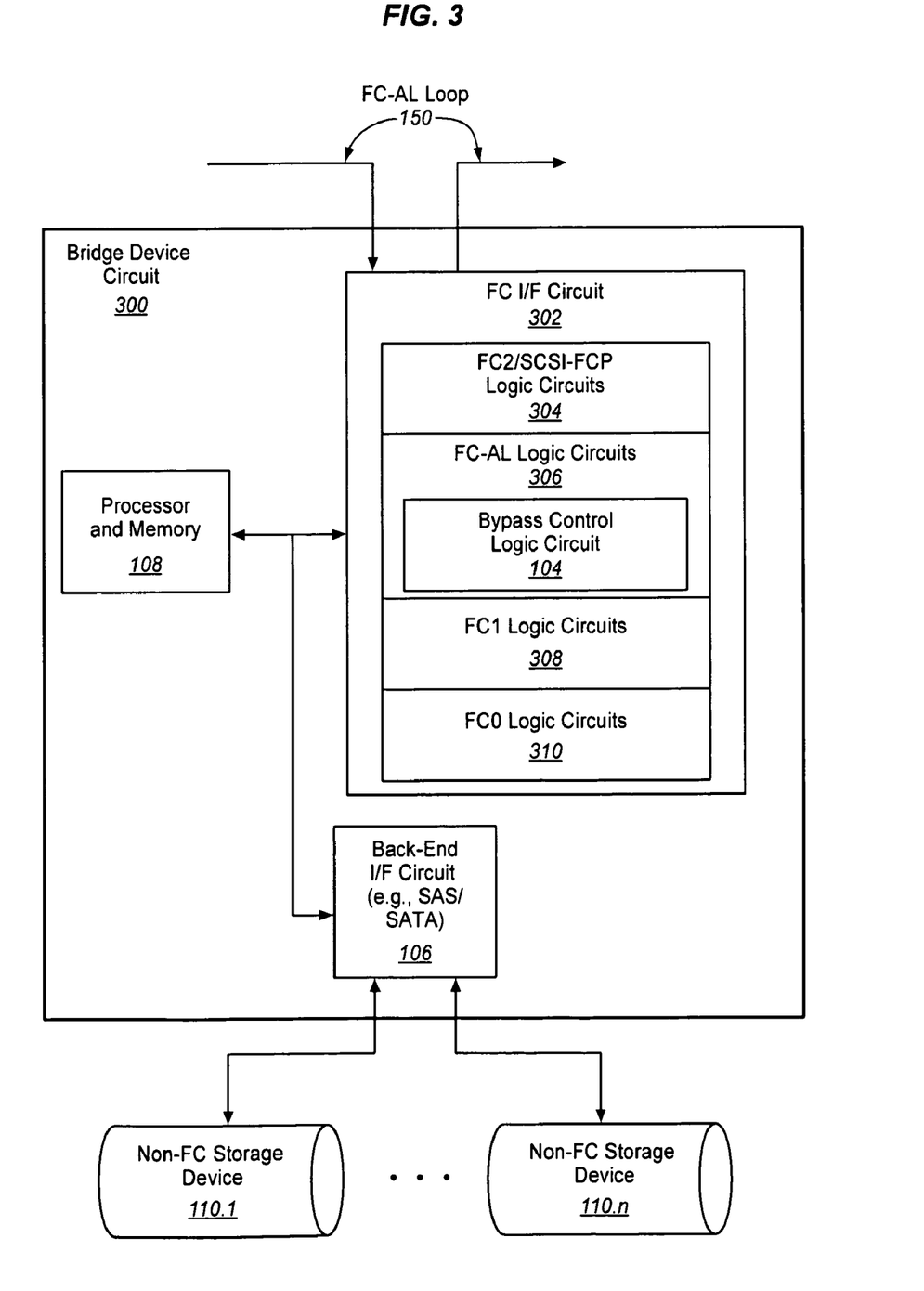
FIG. 3 is a block diagram of another system including an exemplary embodiment of an enhanced bridge device in accordance with features and aspects hereof for coupling a plurality of storage devices to an FC-AL loop.

FIG. 3 is a block diagram providing another exemplary embodiment of an enhanced bridge device circuit 300 for coupling multiple non-Fibre Channel storage devices 110.1 through 110.n to an FC-AL loop communication medium 150. As above with regard to FIG. 1, enhanced bridge device circuit 300 of FIG. 3 may incorporate processor and memory 108 and backend interface circuit 106 (e.g., a SAS/SATA interface circuit). Enhanced bridge device circuit 300 may also include Fibre Channel interface circuit 302 enhanced in accordance with features and aspects hereof to incorporate bypass control logic circuit 104. In particular, Fibre Channel interface circuit 302 may include logic circuits for implementing Fibre Channel layers including FC2/SCSI-FCP (304), FC1 (308), and FC0 (310) as well as FC-AL logic circuits (306) that may incorporate the bypass control logic circuit 104.

Figure 4:
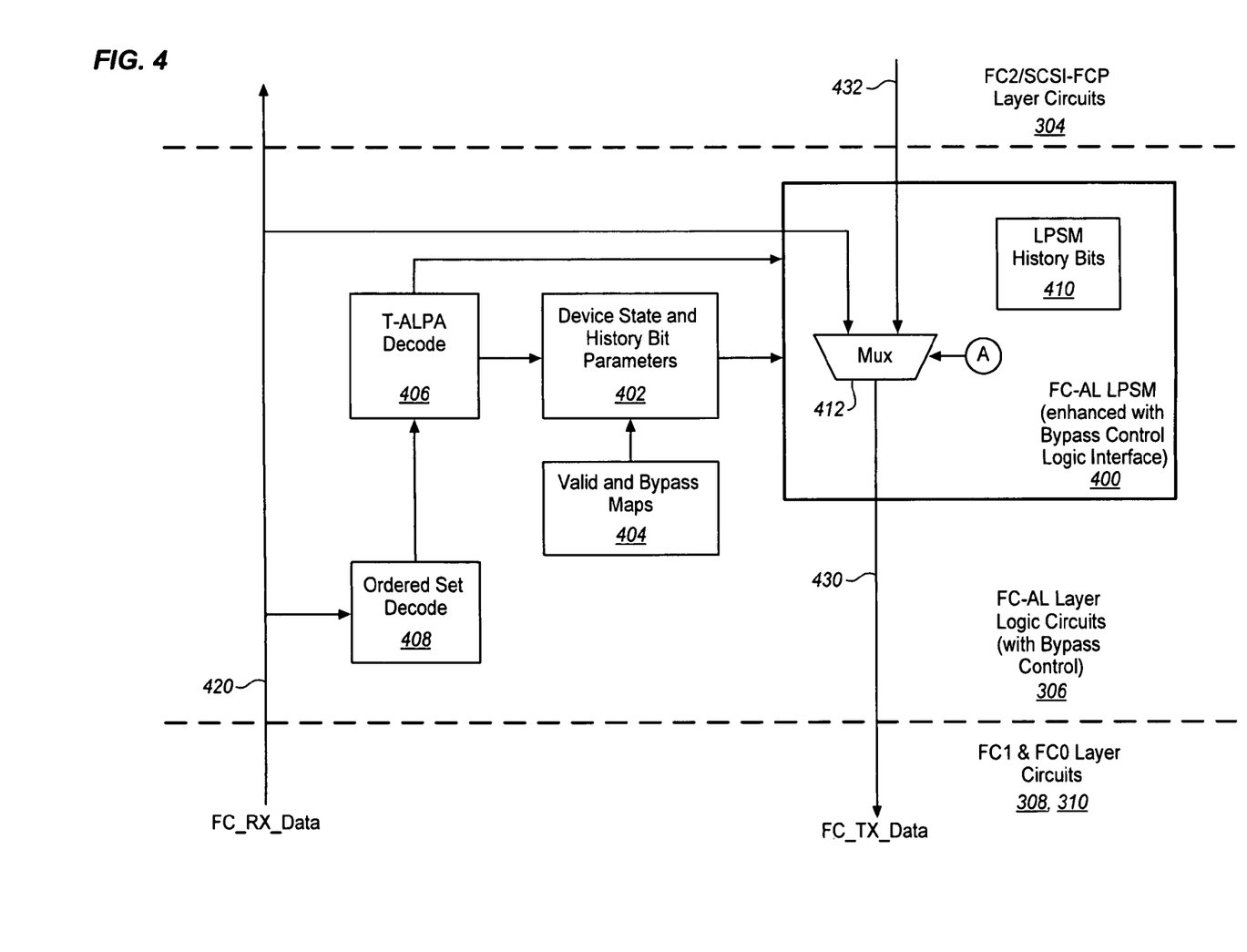
FIG. 4 is a block diagram of exemplary bypass control logic circuits integrated with FC-AL layer logic circuits in accordance with features and aspects hereof.

FIG. 4 is a block diagram providing exemplary additional details of an FC-AL layer logic circuit 306 as noted above with respect to FIG. 3. FC-AL layer logic circuits 306 may incorporate bypass control logic as discussed above. FC-AL layer logic circuits 306 couple with lower-level FC1 and FC0 layer circuits 308 and 310, respectively, and couple with FC2 layer circuits 304. As noted in FIG. 4, FC2 layer circuits 304 may include SCSI-FCP layer protocols. Though the layers may in fact be implemented as separate and distinct logic components, for simplicity of this discussion they are depicted as a single higher layer logic element. Thus as used herein, "FC2" (element 304) represents FC2 layer logic, SCSI-FCP layer logic and any other higher layer Fibre Channel protocol and application circuits and processes. Fibre Channel data received from lower level FC1 and FC0 layer circuits 308 and 310 is applied to path 420 passing through the FC-AL layer logic circuits 306 bound for FC2 layer circuits 304. In the process, ordered set decode logic 408 monitors or snoops the Fibre Channel received data applied to path 420 looking for relevant ordered sets (Fibre Channel arbitrated loop primitive sequences) to be processed by the FC-AL layer logic circuits 306. As is well known to those of ordinary skill in the art, only certain ordered sets (primitive sequences) are relevant to enhanced features and aspects hereof in the loop port state machine (LPSM processing circuit 400 of FIG. 4). In particular, for example, loop port bypass (LPB), loop port enable (LPE), and loop initialization protocol (LIP) primitive sequences and the open (OPN) primitive are of interest to the LPSM processing within the FC-AL circuit 400 as regards enhanced features and aspects hereof. Those of ordinary skill in the art will recognize a variety of other primitive sequences that are processed by the LPSM in accordance with FC-AL standards.

When ordered set decode 408 detects such relevant primitive sequences, T-ALPA decode logic circuit 406 decodes the T-ALPA address within the received ordered set to determine the T-ALPA value to be used as an index in the state processing associated with the multiple T-ALPAs managed by the enhanced bridge circuit. The decoded T-ALPA may then be applied to the FC-AL LPSM circuit 400 and the device state and history bit parameters 402 for use as an index into the various state tables or maps (e.g., bit vectors) used for storing information regarding each of the multiple T-ALPAs managed by the enhanced bridge device. Device state and history bit parameters 402 represents circuitry to retrieve the appropriate valid and bypass information from valid and bypass maps 404 (e.g., bit vectors). For example, the decoded T-ALPA index value may be used to select an appropriate bit of information indicating whether the T-ALPA is presently known to be valid (i.e., presently associated with one of the non-FC storage devices) and whether that particular T-ALPA, if valid, is presently in a bypassed state. The valid and bypass bits representing the present state of the decoded T-ALPA address index are then applied to FC-AL LPSM 400 for further processing. In addition, device state in history bit parameters 402 may use the valid and bypass information retrieved from maps 404 to adjust (e.g., set or clear as appropriate) the various history bits maintained within LPSM 410 of the FC-AL LPSM 400. The actual physical location for storage of the LPSM history bits is a matter of design choice in that it may be implemented within the circuitry for the FC-AL LPSM 400 or may be stored external to the LPSM circuitry such as within the device state in history bit parameters 402 and made available to the LPSM 400 circuitry. Such design choices will be readily apparent to those of ordinary skill in the art based on the desired level of integration of the bypass control logic with the standard LPSM circuitry.

Using the LPSM history bits 410, FC-AL LPSM 400 determines the present status of the REPEAT history bit and applies it to multiplexer 412 (as label "A") to select from one of two sources for data to be applied to the Fibre Channel transmit data path 430. Multiplexer 412 receives a first input from the Fibre Channel received data path 420 and a second input from the higher level FC2 layer circuits 304 via path 432. Selection logic ("A") represents the computation of the REPEAT history bit indicating that a Fibre channel transmission received on the receive data signal path 420 is to be repeated and the applied to the Fibre Channel transmit path 430. If the REPEAT history bit is presently not set, a transmission from the FC2 layer circuits 304 applied to path 432 as an input to multiplexer 412 is then applied to the Fibre Channel transmit path 430 for application to the lower level FC1 (308) and FC0 (310) layers. Thus the device state and history bits determined by element 402 are used for controlling the FC-AL LPSM. However, by contrast with prior techniques where the and LPSM processes only a single T-ALPA or other prior techniques for bridge devices relying on software to control the bypass logic, the enhanced FC-AL circuits 306 with bypass control utilize logic circuits 400 through 412 to implement the requisite bypass logic for multiple T-ALPAs under control of a single bridge device.

In particular, each of the multiple T-ALPAs processed by the enhanced FC-AL layer circuits (306) may be in one of four states based on the valid bit and bypass bit corresponding to each T-ALPA as follows:

| Valid Bit | Bypass Bit | Repeat State !Valid or Bypass | Description |
|---|---|---|---|
| 0 | 0 | 1 | Non-Participating. Corresponding T-ALPA is not participating on the Loop and does not respond to any received primitive sequences or transmit requests directed to it. |
| 1 | 0 | 0 | Participating. Corresponding T-ALPA is enabled on the loop and responds to all received primitive sequences and "frame transmit" requests directed to it. |
| 1 | 1 | 1 | Participating Bypassed. Corresponding T-ALPA is in logical bypass mode and only responds to received LPEyx directed to it or an LPEfx. Any transmit requests using this T-ALPA are ignored. If a LIP is received and all valid T-ALPAs are in the bypass state the LPSM ignores the LIP. |
| 0 | 1 | 1 | Non-Participating Bypassed. Corresponding T-ALPA is not participating on the Loop and does not respond to all received primitive sequences or transmit requests directed to it. |

In addition to the state represented by the valid and bypass bits for each T-ALPA, enhancements in accordance with features and aspects hereof control the various history bits used by the LPSM to control the bypass logic of the FC-AL layer circuits. Specifically, in one exemplary embodiment, the BYPASS, PARTICIPATE, REPEAT, and REPLICATE history bits of the LPSM as specified by the FC-AL LPSM standards may be determined as follows:

| History Bit | Description |
|---|---|
| BYPASS | This history bit is set when an LPB is received addressed to a valid T-ALPA and all other T-ALPAs are already in the logical bypassed state This history bit is cleared when: a. An LPE is received to a valid T-ALPA that is presently is in the logical bypassed state. OR b. A request is made to initialize and the LPSM transitions to the Initializing state (as specified in the FC-AL standards). OR c. A request is made to non-participate and the LPSM transitions to the Initializing state (as specified in the FC-AL standards). OR d. A request is made to go to old port and the LPSM transitions to the Old Port state (as specified in the FC-AL standards). |
| PARTICIPATE | This history bit is set when at least one T-ALPA is valid (i.e., associated with a storage device as evidenced by the valid bit vector). The valid T-ALPAs are determined and corresponding valid bits are set during the initialization process of the bridge device. This history bit is cleared when: |

| History Bit | Description |
|---|---|
| | a. The LPSM is in monitoring state and an LIP is received while BYPASS history bit is set (as specified in the FC-AL standards). OR
b. The LPSM is in Monitoring or Initialize state and a request to non-participate is made by higher layer control software/firmware (as specified in the FC-AL standards). OR
c. The LPSM is in initializing state and a request to go to old port is made by higher layer control software/firmware (as specified in the FC-AL standards). OR
d. The LPSM is in initializing state and a request to bypass is made by higher layer control software/firmware (as specified in the FC-AL standards). |
| REPEAT | !PARTICIPATE or BYPASS |
| REPLICATE | This history bit is set if any OPNyr, or OPNfr is received addressed to any valid non-bypassed T-ALPA. This history bit is cleared under all the conditions specified in the FC-AL-2 specification. |

Still further, individual primitive sequences that relate to the bypass state of the bridge device's LPSM may be processed as follows:

| Primitive/ Primitive Sequence | T-ALPA = valid (Participating) | T-ALPA = !valid (Non-Participating) | T-ALPA = Bypassed |
|---|---|---|---|
| OPNyx | y = T-ALPA
a. y is OPENED full duplex | Any ALPA that is in the invalid state does not respond to any received primitive sequence that is directed to a specific ALPA. | y = T-ALPA
a. OPNyx is ignored |
| OPNyy | y = T-ALPA
a. y is OPENED half duplex | | y = T-ALPA
a. OPNyx is ignored |
| OPNyr | y = T-ALPA
a. Open y (replicate) | | y = T-ALPA
a. OPNyx is ignored |
| OPNfr | f = all
a. If any ALPA is valid in the bit map go to the OPEN replicate mode | | y = fr
a. No affect to T-ALPA in bypass |
| LPByx | y = T-ALPA
a. The T-ALPA has it's corresponding bypass map bit set
b. Interrupt is set, yx is captured
c. The LPSM bypass history variable is set. | | y = T-ALPA
a. The T-ALPAs corresponding bypass map bit is set
b. Interrupt is set, yx is captured
c. The LPSM bypass history bit remains set. |
| LPBfx | y = all
a. All Valid T-ALPAs have their corresponding bypass bit set.
b. Interrupt is set, yx is captured
c. The LPSM bypass history variable is set if any valid T-ALPA is set in the valid map. | | f = all
a. All T-ALPA corresponding bypass bits remain set
b. Interrupt is set, yx is captured
c. The LPSM history bit remains set |
| LPEyx | y = T-ALPA
a. Interrupt is set, yx is captured.
b. The LPSM bypass history variable is cleared. | | y = T-ALPA
a. Corresponding T-ALPA bypass bit map is cleared
b. Interrupt is set, yx is captured |
| LPEfx | f = all
a. Interrupt is set, yx is captured. The LPSM bypass history bit is unconditionally cleared | | f = all
a. Interrupt is set, yx is captured
b. The entire bypass bit map is cleared
c. The LPSM bypass history variable is |

-continued

| Primitive/ Primitive Sequence | T-ALPA = valid (Participating) | T-ALPA = !valid (Non-Participating) | T-ALPA = Bypassed |
|---|---|---|---|
| | | | unconditionally cleared. |
| LIP(F7, F7) LIP(F7, x) | LIP Received Interrupt set. The entire valid bit map is cleared to the invalid state by Software | | |
| LIP(F8, F7) LIP(F8, x) | If the LPSM bypass history variable bit is set the LIP is ignored by the LPSM | | |
| LIPyx | If y = ALPA Reset LIP Received Interrupt set. The entire valid bit map is cleared to the invalid state by Software. If the LPSM bypass history variable bit is set the LIP is ignored by the LPSM | | |
| LIPfx | LIP Received Interrupt set. The entire valid bit map is cleared to the invalid state by Software If the LPSM bypass history variable bit is set the LIP is ignored by the LPSM | | |

Figure 5:
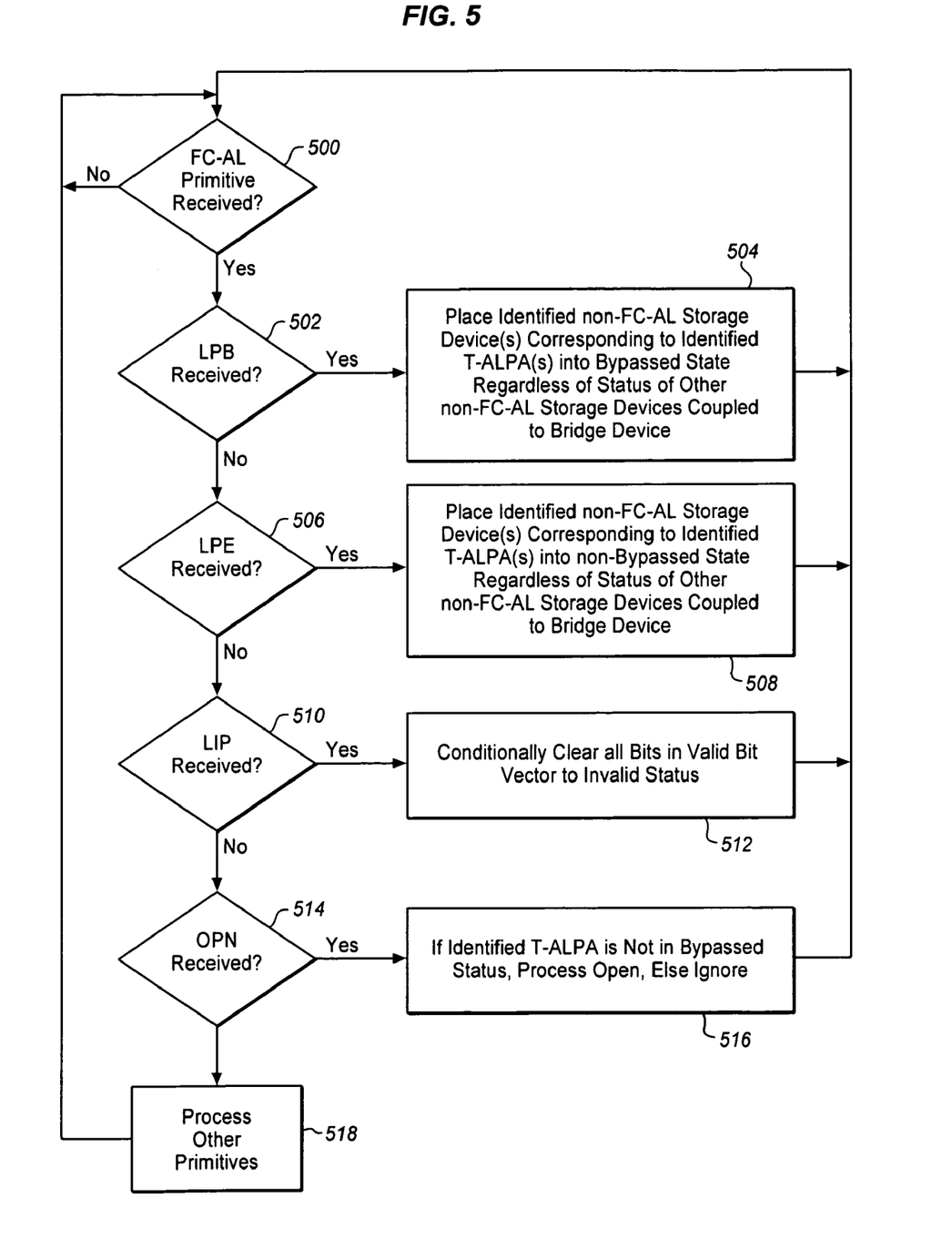
FIGS. 5 through 8 are flowcharts describing exemplary methods for operating an enhanced bridge device in accordance with features and aspects hereof to couple multiple storage devices to an FC-AL loop.

FIG. 5 is a flowchart describing an exemplary method in accordance with features and aspects hereof to provide enhanced bypass control circuitry within a FC-AL bridge device for coupling multiple storage devices to the FC-AL communication medium. The method of FIG. 5 may be operable, for example, in customized circuitry integrated with the LPSM processing of the FC-AL layer circuits as discussed above.

Step 500 awaits receipt of a next primitive sequence from the FC-AL receive data path. Upon receipt of such a primitive sequence, step 502 determines whether the received primitive sequence is a loop port bypass (LPB) primitive sequence. If so, step 504 places the one or more storage devices corresponding to the one or more T-ALPAs identified by the LPB into the bypassed state regardless of the status of other storage devices coupled with the bridge device. More specifically, any one or more of the specified T-ALPAs in the received LPB that are identified to be valid according to the valid bit vector are placed into the bypass state by setting the corresponding bit in the bypass bit vector. Processing then continues awaiting receipt of a next FC-AL primitive sequence at step 500.

If step 502 determines that the received primitive sequence is not an LPB, step 506 determines whether the received primitive sequence as a loop port enable (LPE) primitive sequence. If so, step 508 places the one or more storage devices corresponding to the one or more T-ALPAs identified in the received LPE into the non-bypassed state regardless of the status of other storage devices and corresponding T-ALPAs coupled with the bridge device. More specifically, for each T-ALPA identified in the received LPE that is presently in the valid state according to the valid bit vector, the corresponding bypass bit in the bypass bit vector is cleared to indicate that the device is not in the bypassed state. Processing then continues awaiting receipt of a next FC-AL primitive sequence at step 500.

If step 506 determines that the received primitive sequence is not an LPE, step 510 next determines whether the received primitive sequence is a loop initialization protocol (LIP) primitive sequence. If so, step 512 conditionally clears all bits in the valid bit vector to indicate an invalid status (i.e., T-ALPAs no longer associated with any storage devices until re-initialized). As noted in the table above, the processing of the LIP is conditional in the sense that if the bypass history bit is presently set, the LIP primitive sequence is simply ignored by the LPSM (as is standard in the FC-AL specifications).

If step 510 determines that the received primitive sequence is not an LIP primitive sequence, step 514 next determines whether the received primitive is an open (OPN) primitive. If so, step 516 conditionally processes the OPN primitive. In particular, if the identified T-ALPAs are valid (as indicated by corresponding bits in the valid bit vector) and not presently bypassed (as indicated by corresponding bits in the bypass bit vector), the OPN is processed. Otherwise the OPN primitive is ignored. Processing then continues awaiting receipt of a next FC-AL primitive sequence at step 500.

If step 514 determines that the received primitive sequence was not an OPN primitive, all other primitive sequences are processed at step 518 in accordance with standard LPSM processing as specified in the FC-AL standard. Processing then continues at step 500 to await receipt of a next FC-AL primitive sequence.

Thus the exemplary method of FIG. 5 processes FC-AL primitive sequences (in particular LPB and LPE primitive sequences based on information in the valid bit vector and the bypass bit vector for the multiple T-ALPAs processed by the enhanced bridge device. Further, the exemplary method of FIG. 5 maintains/updates information in the valid and bypass maps (e.g., the valid and bypass bit vectors) to control processing of the LPSM and to update status of each of the multiple storage devices corresponding to T-ALPAs managed by the enhanced bridge device. In addition, the method of FIG. 5 maintains the LPSM history bits based upon the valid and bypass information for each of the multiple T-ALPAs managed by the enhanced bridge device. As noted above, the LPSM history bits may include the BYPASS, PARTICIPATE, REPEAT, and REPLICATE history bits.

Figure 6:
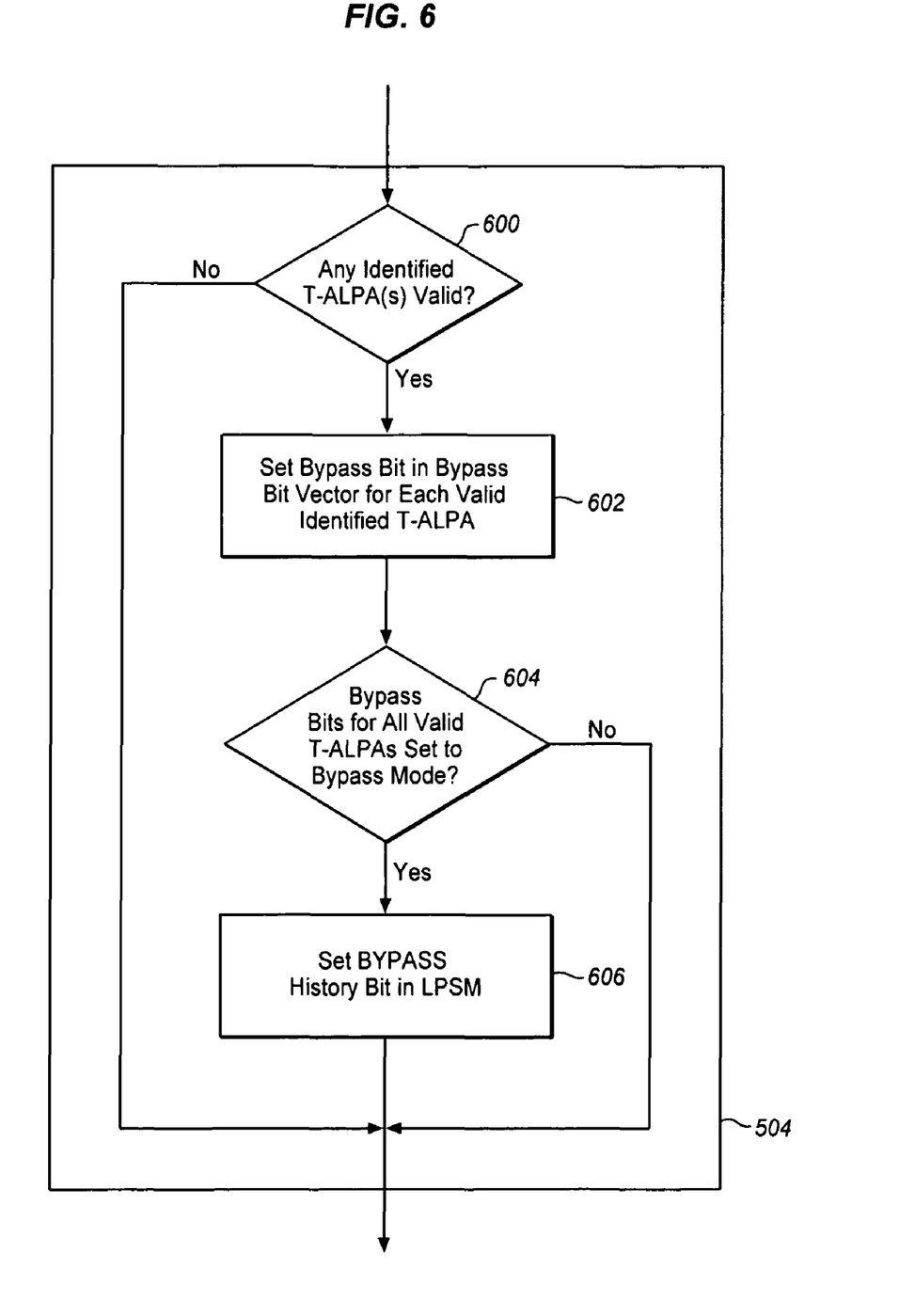

FIG. 6 is a flowchart providing exemplary additional details of the processing of step 504 of FIG. 5. Step 504 represents processing of an LPB primitive sequence to place one or more T-ALPAs identified in the LPB primitive sequence into the bypassed state. Step 600 first determines whether any of the T-ALPAs identified by the received LPB are valid. If none of the identified T-ALPAs are valid as indicated by the valid bit vector, processing of step 504 is complete. If one or more T-ALPAs identified in the LPB are valid, step 602 sets the corresponding bits in the bypass bit vector to indicate that the corresponding valid T-ALPAs are now bypassed.

Step 604 then determines whether all valid T-ALPAs processed by the bridge device are presently in the bypassed state. The step inspects the valid and bypass bit vectors to make that determination. If at least one valid T-ALPA is not in the bypassed state, processing of step 504 is complete. If all valid T-ALPAs are presently in the bypassed state, then step 606 sets the BYPASS history bit to force the FC-AL LPSM logic circuits to bypass processing of any received FC data and simply forward the received data on to the transmit data path. Following step 606, processing of step 504 is complete.

Figure 7:
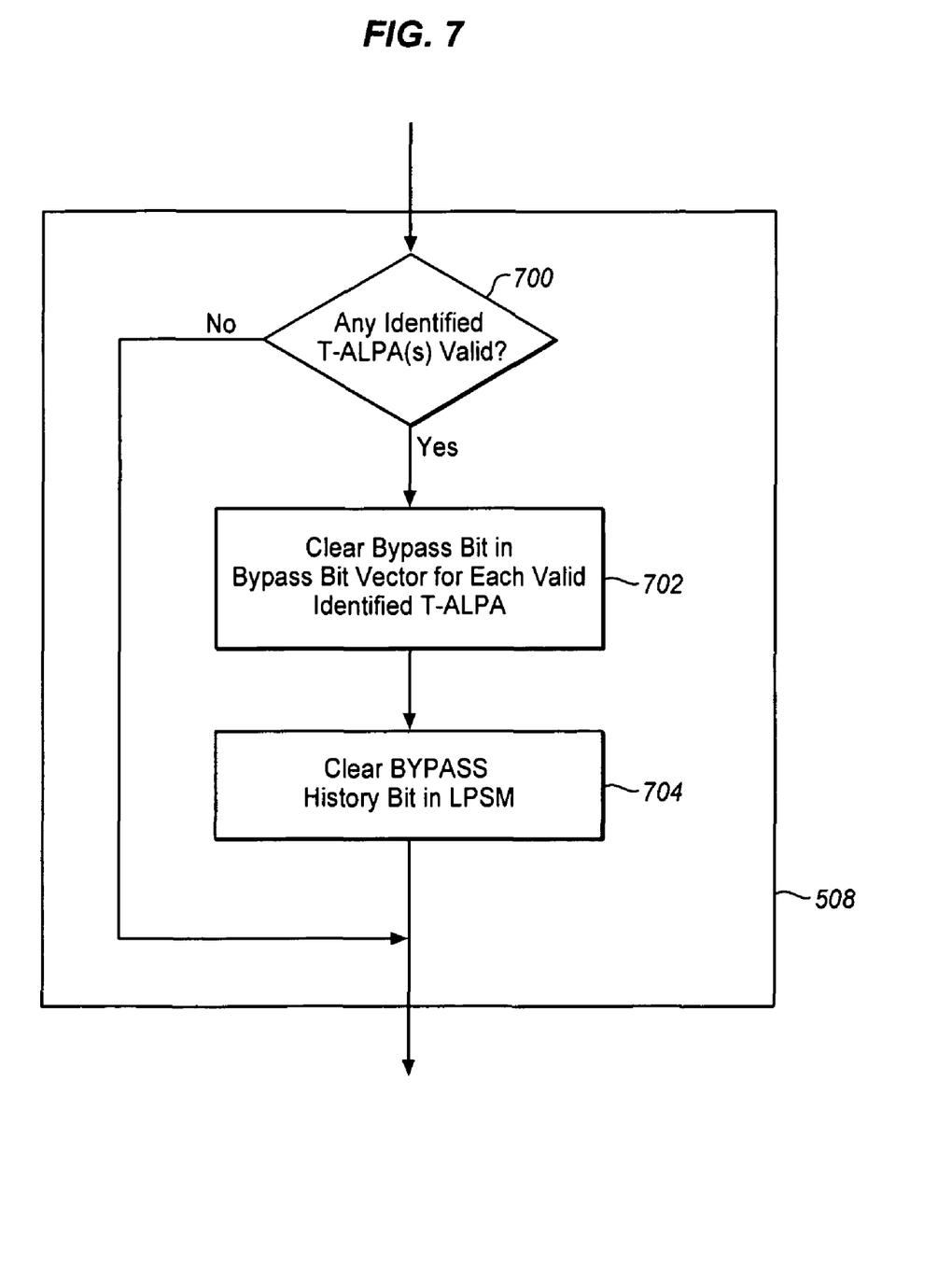

FIG. 7 is a flowchart providing exemplary additional details of the processing of step 508 of FIG. 5. Step 508 represents processing of an LPE primitive sequence to place one or more T-ALPAs identified in the LPE primitive sequence into the non-bypassed state. Step 700 first determines whether any of the T-ALPAs identified by the received LPE are valid. If none of the identified T-ALPAs are valid as indicated by the valid bit vector, processing of step 508 is complete. If one or more T-ALPAs identified in the LPE are valid, step 702 clears the corresponding bits in the bypass bit vector to indicate that the corresponding valid T-ALPAs are now not in the bypassed state. Step 704 then clears the BYPASS history bit since at least one valid T-ALPA processed by the bridge device is now not in the bypassed state. Clearing of the BYPASS history bit allows the FC-AL LPSM circuits to analyze each received data from the receive path of the FC-AL loop to determine if the particular, identified T-ALPA in each received primitive sequence is presently in the bypassed state or not and thus to repeat the data on the FC-AL loop transmit path or process the received primitive sequence.

Figure 8:
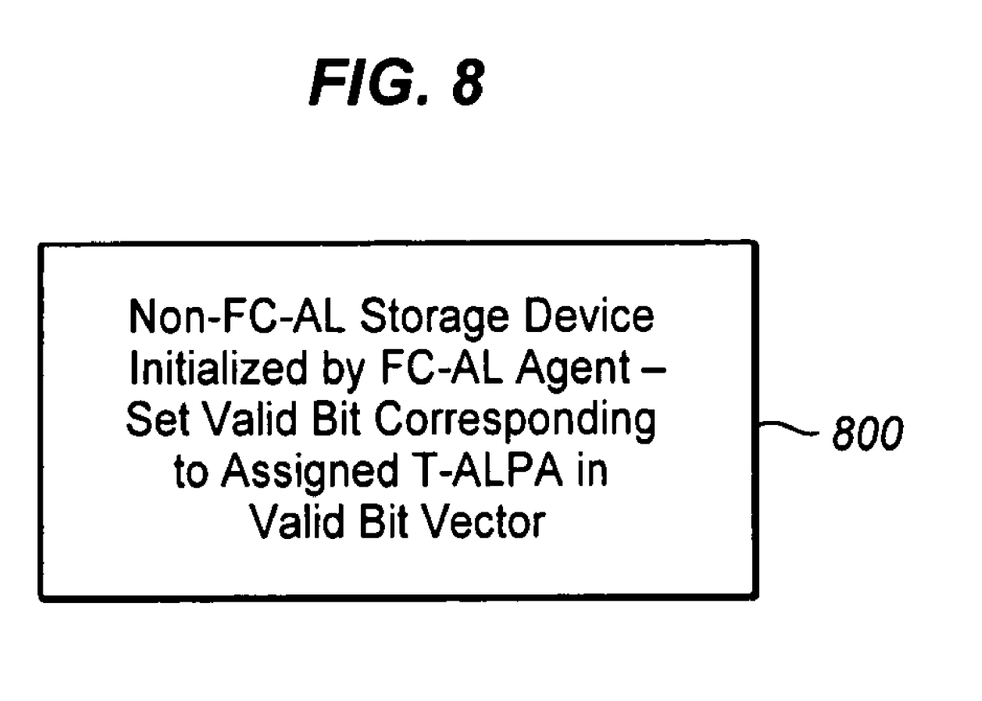

FIG. 8 depicts another exemplary method operable in an enhanced bridge device in accordance with features and aspects hereof. When the bridge device is initialized (or re-initialized) in accordance with standard FC-AL protocols, all T-ALPAs are considered invalid—i.e., the valid and bypass bits in the vectors are cleared. Step 800 represents standard processing in accordance with the FC-AL protocols wherein an agent on the FC-AL loop associates a T-ALPA with each device known to the loop. The enhanced bridge device will know of all storage devices coupled through its back-end interface by, for example, a discover process such as is well known in the SAS/SATA interface standards. As each storage device known to the bridge device (and thus to the FC-AL loop structure) is associated with a corresponding T-ALPA, step 800 also sets the corresponding valid bit in the valid bit vector to indicate that the T-ALPA (and thus its corresponding storage device) is now valid (i.e., participating).

Those of ordinary skill in the art will recognize numerous additional and equivalent circuits and steps in a fully functional enhanced bridge device and its associated methods of operation. Such additional and equivalent elements are omitted herein for simplicity and brevity of this discussion. Further, those of ordinary skill in the art will readily recognize a variety of memory structures that may be used to store the valid and bypass information for each T-ALPA processed by the bridge device. Since present FC-AL standards provide for a maximum of 127 such T-ALPAs on any FC-AL loop, the chosen memory structure need, at present, store valid and bypass information for at most 127 T-ALPAs. Thus, simple register memory structures are adequate in providing for the desired function but any suitable memory structure may be used as a matter of design choice.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What claimed is:

1. A Fibre Channel bridge device comprising:
a Fibre Channel interface circuit for coupling with a Fibre Channel arbitrated loop (FC-AL) wherein the Fibre Channel interface circuit responds to multiple target arbitrated loop physical addresses (T-ALPAs);
a back-end interface circuit to couple with a plurality of storage devices wherein the plurality of storage devices are not FC-AL storage devices; and
a bypass control logic circuit coupled with the Fibre Channel interface circuit and coupled with the back-end interface circuit wherein the bypass control logic circuit to map one of the multiple T-ALPAs to each of the plurality of storage devices and wherein the bypass control logic circuit processes loop port enable (LPE) and loop port bypass (LPB) Fibre Channel primitive sequences for each of the multiple T-ALPAs so as to bypass and enable individual ones of the plurality of storage devices regardless of a state of others of the plurality of storage devices.

2. The bridge device of claim 1
wherein the back-end interface circuit is a Serial Attached Small computer system interface (SAS) interface circuit for coupling to a plurality of SAS storage devices.

3. The bridge device of claim 1
wherein the back-end interface circuit is a serial advanced technology attachment (SATA) interface circuit for coupling to a plurality of SATA storage devices.

4. The bridge device of claim 1
wherein the bypass control logic circuit further comprises:
a bypass bit vector comprising a plurality of bypass bits wherein each bypass bit corresponds to one of the multiple T-ALPAs and wherein the value of said each bypass bit indicates whether a storage device presently associated with a corresponding T-ALPA is presently in a bypassed state; and
a valid bit vector comprising a plurality of valid bits wherein each valid bit corresponds to one of the multiple T-ALPAs and wherein the value of said each valid bit indicates whether a storage device presently associated with a corresponding T-ALPA is presently in a participating state.

5. The bridge device of claim 4
wherein the bypass control logic circuit sets a valid bit in the valid bit vector in response to obtaining a valid T-ALPA for the corresponding storage device.

6. The bridge device of claim 4
wherein the bypass control logic circuit further comprises:
a loop port state machine (LPSM) circuit to process LPB and LPE primitive sequences for each of the multiple T-ALPAs based on the bypass bit vector and the valid bit vector.

7. The bridge device of claim 6
wherein the LPSM maintains history bits based on the bypass bit vector and the valid bit vector, the history bits including a BYPASS history bit and a PARTICIPATE history bit.

8. The bridge device of claim 7
wherein the LPSM is to set the BYPASS history bit when an LPB primitive sequence is processed for a storage device that is determined to be valid according to the valid bit vector when all other storage devices are bypassed as determined by the bypass bit vector and the valid bit vector.

9. The bridge device of claim 7
wherein the LPSM is to set the PARTICIPATE history bit when any storage device coupled with the bridge device is presently in the participating state as determined by the valid bit vector.

10. A method operable in a Fibre Channel Arbitrated Loop (FC-AL) interface circuit of an FC-AL bridge device to couple multiple non-FC-AL storage devices to an FC-AL communication medium, the method comprising:
placing a particular storage device coupled with the bridge device into a non-bypassed state in response to receipt by the bridge device of a loop port enable (LPE) primitive sequence received from the FC-AL communication medium identifying the particular storage device, wherein the particular storage device is entered into a non-bypassed state regardless of a bypassed/non-bypassed state of other storage devices coupled with the bridge device; and
placing a particular storage device coupled with the bridge device into a bypassed state in response to receipt by the bridge device of a loop port bypass (LPB) primitive sequence received from the FC-AL communication medium identifying the particular storage device, wherein the particular storage device is entered into a bypassed state regardless of the bypassed/non-bypassed state of other storage devices coupled with the bridge device.

11. The method of claim 10 further comprising:
maintaining a valid bit vector where each valid bit of the valid bit vector indicates whether or not a corresponding target arbitrated loop physical address (T-ALPA) has been associated with a storage device coupled with the bridge device; and
maintaining a bypass bit vector where each bypass bit of the bypass bit vector indicates whether the storage device associated with the corresponding T-ALPA is in a bypassed state or in a non-bypassed state.

12. The method of claim 11 further comprising:
maintaining history bits based on the bypass bit vector and the valid bit vector, the history bits including a BYPASS history bit and a PARTICIPATE history bit.

13. The method of claim 12
wherein the step of maintaining history bits further comprises:
setting the BYPASS history bit when an LPB primitive sequence is processed for a storage device that is determined to be valid according to the valid bit vector when all other storage devices are in the bypassed state as determined by the bypass bit vector and the valid bit vector.

14. The method of claim 12
wherein the step of maintaining history bits further comprises:
setting the PARTICIPATE history bit when any storage device coupled with the bridge device is presently in the participating state as determined by a valid bit in the valid bit vector indicating that a corresponding T-ALPA has been associated with a storage device.

15. A bridge device for coupling a plurality of Serial Attached Small computer system interface (SAS) storage devices and/or serial advanced technology attachment (SATA) storage devices to a Fibre Channel arbitrated loop (FC-AL) communication medium, the bridge device comprising:
a back-end interface circuit to couple with a plurality of SAS/SATA storage devices; and
a Fibre Channel interface circuit coupled with the back-end interface for coupling with the FC-AL communication medium, the Fibre Channel interface circuit including logic circuits for implementing FC0, FC1, FC2, Small Computer System Interface Fibre Channel Protocol (SCSI FCP), and FC-AL layers of Fibre Channel protocols, the FC-AL layer logic circuits including:
a bypass control logic circuit to map multiple target arbitrated loop physical addresses (T-ALPAs) to corresponding storage devices of the plurality of storage devices and wherein the bypass control logic circuit processes loop port enable (LPE) and loop port bypass (LPB) Fibre Channel primitive sequences for each of the multiple T-ALPAs so as to bypass and enable individual ones of the plurality of storage devices regardless of a state of others of the plurality of storage devices.

16. The bridge device of claim 15
wherein the bypass control logic circuit further comprises:
a bypass bit vector comprising a plurality of bypass bits wherein each bypass bit corresponds to one of the multiple T-ALPAs and wherein the value of said each bypass bit indicates whether a storage device presently associated with a corresponding T-ALPA is presently in a bypassed state; and
a valid bit vector comprising a plurality of valid bits wherein each valid bit corresponds to one of the multiple T-ALPAs and wherein the value of said each valid bit indicates whether a storage device presently associated with a corresponding T-ALPA is presently in a participating state.

17. The bridge device of claim 16
wherein the bypass control logic circuit further comprises:
a loop port state machine (LPSM) operable in accordance with Fibre Channel standards;
a BYPASS history bit used by the LPSM to control the FC-AL communication medium; and
a PARTICIPATE history bit used by the LPSM to control the FC-AL communication medium,
wherein the bypass control logic circuit sets the BYPASS history bit when an LPB primitive sequence is processed for a storage device that is determined to be valid according to the valid bit vector when all other storage devices are in the bypassed state as determined by the bypass bit vector and the valid bit vector, and
wherein the bypass control logic circuit sets the PARTICIPATE history bit when any storage device coupled with the bridge device is presently in the participating state as determined by a valid bit in the valid bit vector indicating that a corresponding T-ALPA has been associated with a storage device.

* * * * *